US012325199B2

(12) United States Patent
Buley et al.

(10) Patent No.: US 12,325,199 B2
(45) Date of Patent: Jun. 10, 2025

(54) VACUUM SYSTEM FOR HOLDING OR COMPACTING AN OBJECT

(71) Applicant: The Boeing Company, Chicago, IL (US)

(72) Inventors: Courtney Hund Buley, Mount Pleasant, SC (US); Luis Velasquez, Charleston, SC (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 18/151,307

(22) Filed: Jan. 6, 2023

(65) Prior Publication Data

US 2024/0227327 A1    Jul. 11, 2024

(51) Int. Cl.
*B29C 70/54* (2006.01)
*B29C 70/44* (2006.01)

(52) U.S. Cl.
CPC .......... *B29C 70/544* (2021.05); *B29C 70/443* (2013.01)

(58) Field of Classification Search
CPC ...... B29C 70/544; B29C 70/443; B29C 70/44
See application file for complete search history.

(56) References Cited

U.S. PATENT DOCUMENTS

2017/0368719 A1* 12/2017 Jones .................... B29C 70/546
2021/0107169 A1*  4/2021 Velasquez ............ B25J 15/0616

* cited by examiner

*Primary Examiner* — Jacob T Minskey
*Assistant Examiner* — Adrianna N Konves
(74) *Attorney, Agent, or Firm* — Yee & Associates, P.C.

(57) ABSTRACT

A vacuum system and methods of managing an object against a support structure are presented. A vacuum system for at least one of holding or compacting an object is presented. The vacuum system comprises an impermeable layer, a number of pressure inlets extending through the impermeable layer, and a number of valve handles connected to the number of pressure inlets. The number of valve handles is configured to actuate between an active position applying a vacuum to the impermeable layer or an inactive position venting the impermeable layer to atmosphere.

21 Claims, 16 Drawing Sheets

VACUUM SYSTEM FOR HOLDING OR COMPACTING AN OBJECT

BACKGROUND INFORMATION

1. Field

The present disclosure relates generally to manufacturing operations and more specifically to holding or compacting an object during manufacturing.

2. Background

Composite materials are strong, light-weight materials created by combining two or more functional components. For example, a composite material may include reinforcing fibers bound in polymer resin matrix. The fibers can take the form of a unidirectional tape, woven cloth or fabric, or a braid.

In manufacturing composite structures, layers of composite material are typically laid up on a tool. The layers may be comprised of fibers in sheets. In some cases, resin may be infused or pre-impregnated into the sheets. These types of sheets are commonly referred to as prepreg.

After laying up a layer of composite material on a tool, the composite material can be compacted onto the tool. Compaction can flatten and remove air and wrinkles from the composite material. In manufacturing composite structures with multiple composite material components, compaction is performed for multiple composite material components simultaneously. Compacting each of the components simultaneously can reduce material costs and time for preparations such as taping and sealing prior to compaction. However, compacting each of the components simultaneously can result in undesirable quality of the compacted components.

Therefore, it would be desirable to have a method and apparatus that takes into account at least some of the issues discussed above, as well as other possible issues.

SUMMARY

An embodiment of the present disclosure provides a vacuum system for at least one of holding or compacting an object. The vacuum system comprises an impermeable layer, a number of pressure inlets extending through the impermeable layer, and a number of valve handles connected to the number of pressure inlets. The number of valve handles is configured to actuate between an active position applying a vacuum to the impermeable layer or an inactive position venting the impermeable layer to atmosphere.

An embodiment of the present disclosure provides a vacuum system for at least one of holding or compacting an object. The vacuum system comprises an impermeable layer, and a number of valve handles connected to the impermeable layer. The number of valve handles is configured to control application of vacuum to an impermeable layer and provide a carry mechanism.

Yet another embodiment of the present disclosure provides a method of managing an object against a support structure. An impermeable layer of a vacuum system is positioned over the object and a portion of the support structure while holding a number of valve handles of the vacuum system in an inactive position so that the impermeable layer is vented to atmosphere. A number of valve handles of the vacuum system is released while the impermeable layer is in contact with the support structure to actuate the number of valve handles to an active position to apply a vacuum to the impermeable layer.

A further embodiment of the present disclosure provides a method of managing an object against a support structure. An impermeable layer of a vacuum system is positioned over the object and a portion of the support structure while the impermeable layer is vented to atmosphere. A number of valve handles of the vacuum system is released while the impermeable layer is in contact with the support structure to apply a vacuum to the impermeable layer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
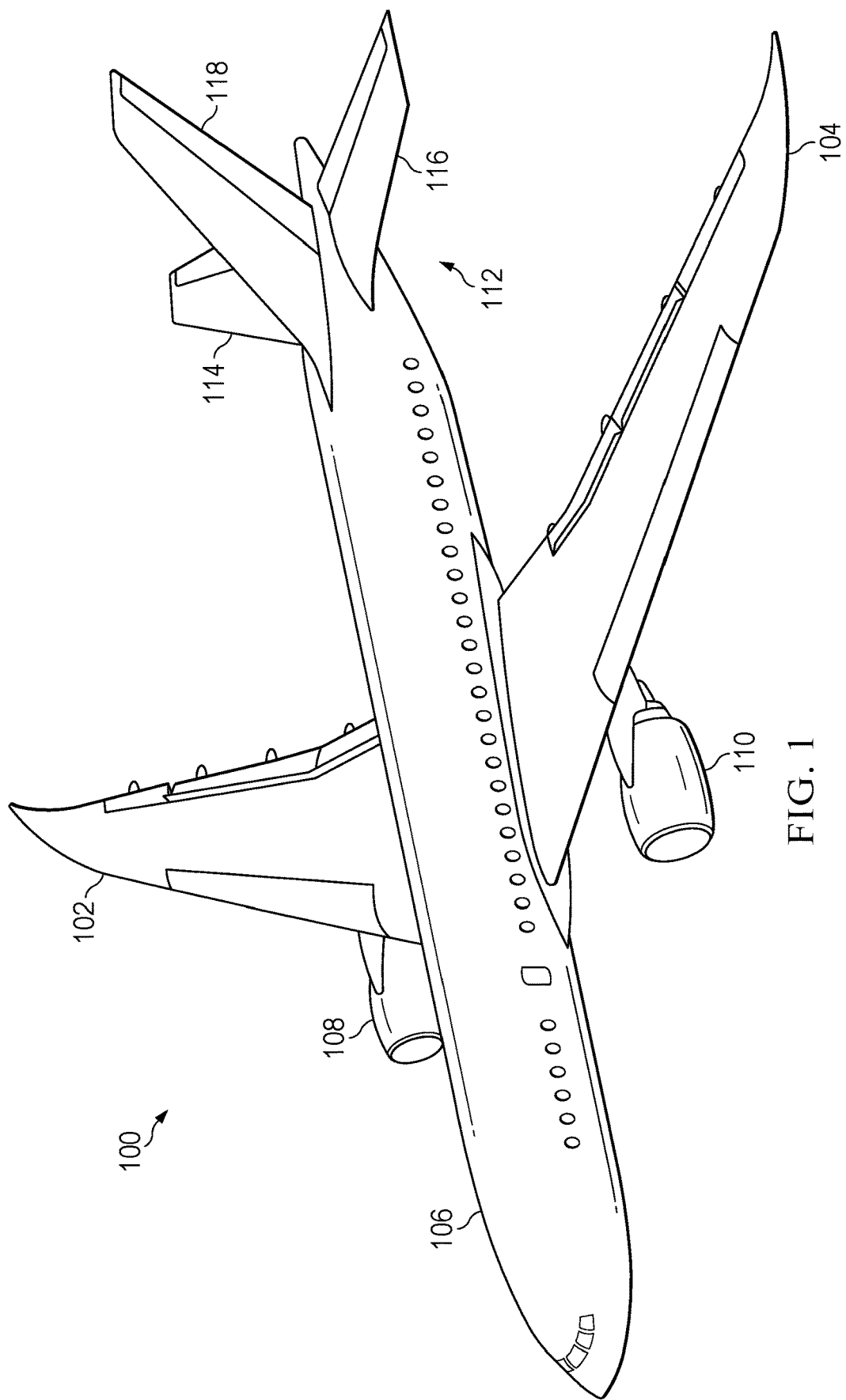
FIG. 1 is an illustration of an aircraft in accordance with an illustrative embodiment.

The illustrative examples recognize and take into account one or more different considerations. The illustrative examples recognize and take into account that some composite structures include small composite components. One type of small composite component is a frame filler. The illustrative examples recognize and take into account that a current frame filler installation process on an aircraft mandrel segment includes individually preparing a frame filler, seating the individual frame filler in the corresponding recess on the mandrel segment surface one at a time, lining up the frame filler edges to the tool recesses on the mandrel segment and pressing firmly onto the frame filler to ensure that it securely adheres to the segment with hand pressure, and repeating the above steps until all of the frame fillers are installed for the mandrel segment. After all of the frame fillers are installed, bladders are installed and the entire segment is compacted with a large-scale compaction bag. The full compaction can take an undesirable amount of time.

The illustrative examples recognize and take into account that currently the frame filler is placed with low tack on a low tack surface and it is hoped that it does not fall before vacuum bagged when all are placed and compacted. In some structures, there can be a large number of small composite components. In some structures, there can be more than 1000 small composite components.

The illustrative examples recognize and take into account that this conventional process involves installing frame fillers one at a time, manually seating the frame fillers onto the mandrel segment using hand pressure. The illustrative examples recognize and take into account that while other frame fillers are placed on the mandrel segment, other frame fillers may slip from their set positions. The hand pressure can be insufficient for maintaining the position of the frame filler. The illustrative examples recognize and take into account that some positions on the mandrel segment can be undesirably difficult to reach with sufficient manual pressure. The illustrative examples recognize and take into account that compacting after all frame fillers are placed can produce insufficient/inconsistent compaction, adverse ergonomic conditions, large time durations in which the frame fillers are without compaction, and slipped/missing frame fillers.

The illustrative examples present a solution for the technical problem of how to reduce slipped/missing frame fillers. The illustrative examples mitigate the risks of undesirable quality and satisfy the frame filler compaction by providing localized compaction method immediately following the frame filler installation. The illustrative examples provide a vacuum compaction device for small composite details. The illustrative examples provide a vacuum system for holding or compacting a composite material that operates without tape for compaction. The illustrative examples provide isolated compaction that can reduce or eliminate full bag compaction steps at the end of the frame filler installation process. The illustrative examples reduce critical path flow time. The illustrative examples also improve quality results, enable concurrent work, and improve ergonomic conditions.

In some of the illustrative examples, the frame filler is placed and then the end effector compactor is placed, a vacuum is drawn on the end effector without sealing tape, the frame filler is uniformly compacted and then the vacuum is removed and the end effector is separated. The end effector could be counterbalanced to reduce the weight of the end effector and the vacuum line. The end effector is configured for single hand placement and operation. It is possible to make the end effector transparent to help with frame filler placement and indexing.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft with components that can be manufactured using a vacuum system of the illustrative examples. For example, body 106 can be manufactured by compacting frame fillers using a vacuum system of the illustrative examples.

Figure 2:
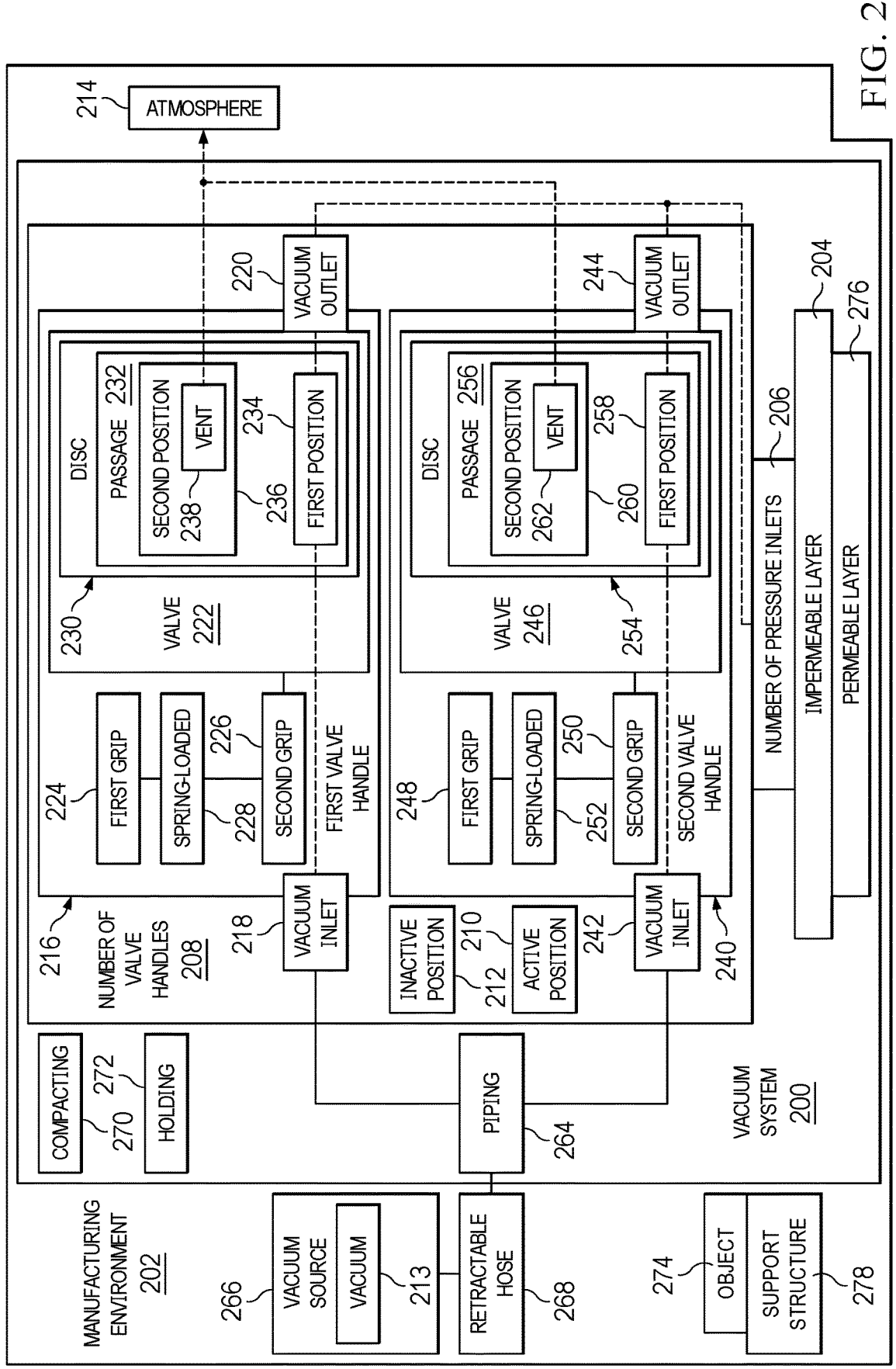
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Vacuum system 200 in manufacturing environment 202 can be used to manufacture portions of aircraft 100 of FIG. 1.

Vacuum system 200 comprises impermeable layer 204, number of pressure inlets 206 extending through impermeable layer 204, and number of valve handles 208 connected to number of pressure inlets 206. Number of valve handles 208 is configured to actuate between active position 210 applying vacuum 213 to impermeable layer 204 or inactive position 212 venting impermeable layer 204 to atmosphere 214.

The area beneath impermeable layer 204 receives vacuum in active position 210 or is vented when number of valve handles 208 is in inactive position 212. In some illustrative examples, vacuum system 200 comprises permeable layer 276 configured to disperse vacuum 213 beneath impermeable layer 204. When permeable layer 276 is present, when number of valve handles 208 is in active position 210, vacuum 213 is applied to permeable layer 276. Permeable layer 276 disperses vacuum 213 beneath impermeable layer 204. When permeable layer 276 is present, when number of valve handles 208 is in inactive position 212, permeable layer 276 is vented to atmosphere 214. Venting of permeable layer 276 vents the area beneath impermeable layer 204. Thus, when number of valve handles 208 is in active position 210, vacuum 213 is applied to impermeable layer 204, and when number of valve handles 208 is in inactive position 212, impermeable layer 204 is vented to atmosphere 214.

Each of number of valve handles 208 comprises a vacuum inlet, a vacuum outlet, a valve between the vacuum inlet and the vacuum outlet, a first grip, and a second grip moveable relative to the first grip to actuate the valve. For example, first valve handle 216 comprises vacuum inlet 218, vacuum outlet 220, valve 222 between vacuum inlet 218 and vacuum outlet 220, first grip 224, and second grip 226 moveable relative to first grip 224 to actuate valve 222. In some illustrative examples, each valve handle of number of valve handles 208 is spring-loaded to active position 210. For example, first valve handle 216 is spring-loaded 228 to active position 210. In this illustrative example, second grip 226 is spring-loaded 228 away from first grip 224.

Each valve handle of number of valve handles 208 comprises a disc with a passage that extends through the disc and moves between a first position to apply vacuum 213 to impermeable layer 204 and a second position to block a flow of vacuum 213 to impermeable layer 204 and to vent impermeable layer 204. For example, first valve handle 216 comprises disc 230 with passage 232 that extends through disc 230 and moves between first position 234 to apply vacuum 213 to impermeable layer 204 and second position 236 to block a flow of vacuum 213 to impermeable layer 204 and to vent 238 impermeable layer 204 to atmosphere 214.

When valve 222 is positioned in first position 234, vacuum 213 supplied to vacuum inlet 218 travels through passage 232 to vacuum outlet 220 and a respective pressure inlet of number of pressure inlets 206. As second grip 226 is spring-loaded 228 away from first grip 224, first valve handle 216 is configured to provide vacuum 213 to impermeable layer 204 when vacuum system 200 is not held by an operator. A passage is open to the atmosphere when a respective valve handle is held by an operator. In some illustrative examples, passage 232 is open to atmosphere 214 when first valve handle 216 is held by an operator.

As depicted, number of valve handles 208 comprises two valve handles. For example, second valve handle 240 comprises vacuum inlet 242, vacuum outlet 244, valve 246 between vacuum inlet 242 and vacuum outlet 244, first grip 248, and second grip 250 moveable relative to first grip 248 to actuate valve 246. Second valve handle 240 is spring-loaded 252 to active position 210. In this illustrative example, second grip 250 is spring-loaded 252 away from first grip 248.

Second valve handle 240 comprises disc 254 with passage 256 that extends through disc 254 and moves between first position 258 to apply vacuum 213 to impermeable layer 204 and second position 260 to block a flow of vacuum 213 to impermeable layer 204 and to vent 262 impermeable layer 204 to atmosphere 214.

When valve 246 is positioned in first position 258, vacuum 213 supplied to vacuum inlet 242 travels through passage 256 to vacuum outlet 244 and a respective pressure inlet of number of pressure inlets 206. As second grip 250 is spring-loaded 252 away from first grip 248, second valve handle 240 is configured to provide vacuum 213 to impermeable layer 204 when vacuum system 200 is not held by an operator. In some illustrative examples, passage 256 is open to atmosphere 214 when a respective valve handle is held by an operator. In some illustrative examples, passage 256 is open to atmosphere 214 when second valve handle 240 is held by an operator.

In this illustrative example, the two valve handles, first valve handle 216 and second valve handle 240, are pneumatically connected to a single vacuum source, vacuum source 266. In this illustrative example, piping 264 connects vacuum inlet 218 and vacuum inlet 242 to vacuum source 266. In some illustrative examples, retractable hose 268 is pneumatically connected to number of valve handles 208. When present, retractable hose 268 can also act to suspend vacuum system 200 when not in use. Retractable hose 268 can be a spring retractable hose reel. In some of these illustrative examples, retractable hose 268 provides both device load support with hose management in one system.

Vacuum system 200 can be used for at least one of holding 272 or compacting 270 object 274. In some illustrative examples, vacuum system 200 for at least one of holding 272 or compacting 270 object 274 comprises impermeable layer 204, and number of valve handles 208 connected to impermeable layer 204. Number of valve handles 208 is configured to control application of vacuum 213 to impermeable layer 204 and provide a carry mechanism.

Vacuum system 200 can be used in managing object 274 against support structure 278. Impermeable layer 204 of vacuum system 200 is positioned over object 274 and a portion of support structure 278 while holding number of valve handles 208 of vacuum system 200 in inactive position 212 so that impermeable layer 204 is vented to atmosphere 214. Number of valve handles 208 of vacuum system 200 is released while impermeable layer 204 is in contact with support structure 278 to actuate number of valve handles 208 to active position 210 to apply vacuum 213 to impermeable layer 204.

Object 274 can take any desirable form. In some illustrative examples, object 274 is a composite material. In some illustrative examples, object 274 is a composite preform. In some illustrative examples, object 274 is a frame filler. In some illustrative examples, object 274 is a film or covering. In some illustrative examples, object 274 is formed of a non-composite material.

In some illustrative examples, managing object 274 includes holding 272 object 274 against support structure 278. In this illustrative example, applying vacuum 213 to impermeable layer 204 holds object 274 against support structure 278. In some illustrative examples, holding 272 object 274 is temporary. In some illustrative examples, after removing vacuum system 200, object 274 can be removed from or repositioned on support structure 278. In some illustrative examples, after holding 272 object 274 against support structure 278, compacting 270 is performed on object 274.

In some illustrative examples, managing object 274 includes compacting 270 object 274 against support structure 278. In some illustrative examples, applying vacuum 213 to impermeable layer 204 compresses object 274 against support structure 278.

In some illustrative examples, after managing object 274, number of valve handles 208 of vacuum system 200 is squeezed to actuate number of valve handles 208 to inactive position 212 venting impermeable layer 204 to atmosphere 214. After venting impermeable layer 204, vacuum system 200 is moved away from object 274 and support structure 278. Support structure 278 can take any desirable form. In some illustrative examples, support structure 278 can take the form of a tool, such as a mandrel.

In some illustrative examples, vacuum system 200 can be used for either holding 272 or compacting 270 depending on an amount of vacuum 213 supplied to vacuum system 200. In some illustrative examples, regulation of vacuum 213 supplied to vacuum system 200 selects whether vacuum system 200 performs holding 272 or compacting 270. Compacting 270 utilizes a higher level of vacuum 213 than holding 272.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, second valve handle 240 can be optional. In some illustrative examples, number of valve handles 208 includes only first valve handle 216.

In some illustrative examples, a tool support is supplied for holding vacuum system 200 when not in use. In some illustrative examples, a counter-balance is supplied so that vacuum system 200 can be hung from a tool support to reduce the weight.

Figure 3:
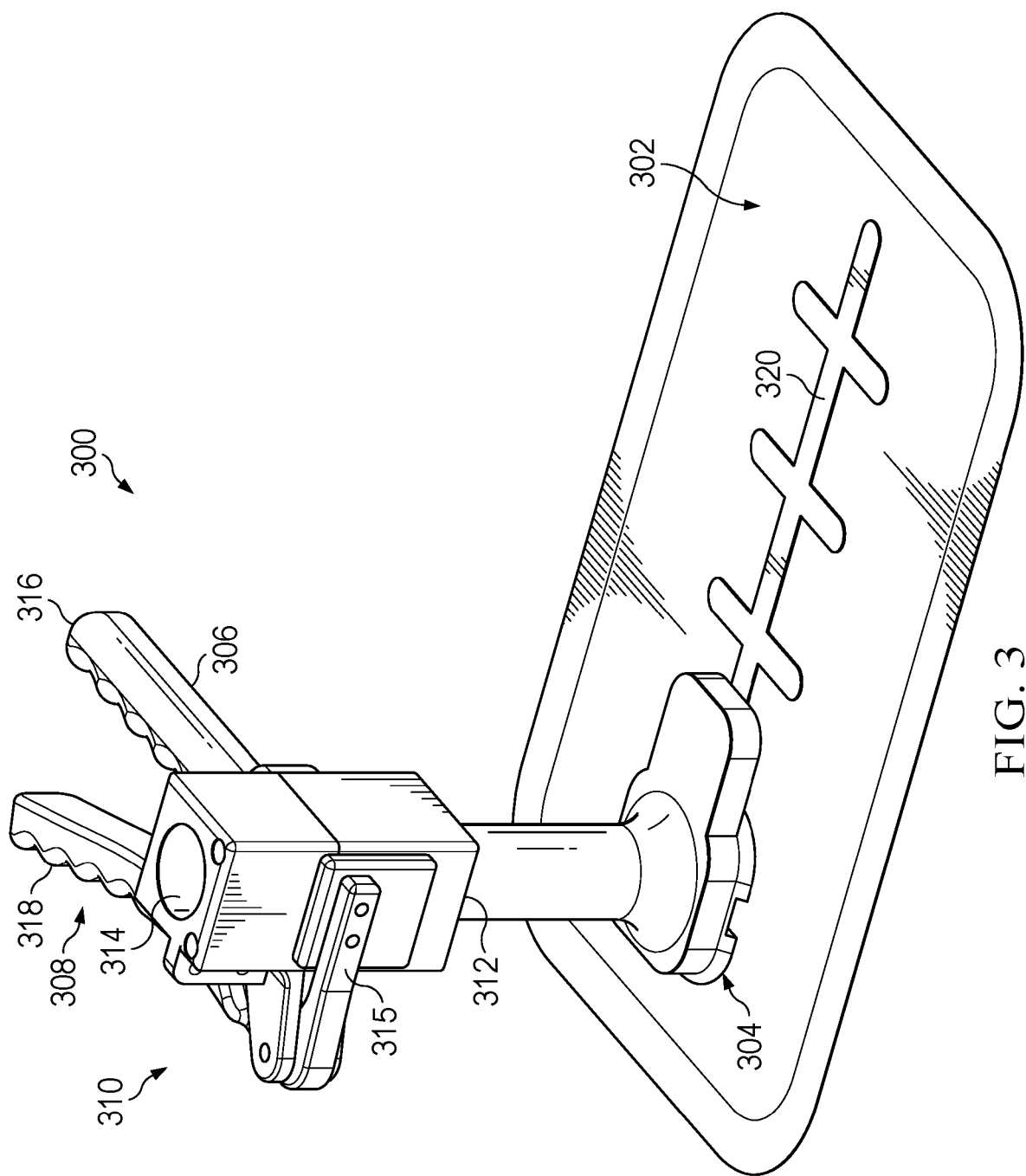
FIG. 3 is an illustration of a perspective view of a vacuum system with one valve handle in accordance with an illustrative embodiment.

Turning now to FIG. 3, an illustration of a perspective view of a vacuum system with one valve handle is depicted in accordance with an illustrative embodiment. Vacuum system 300 is a physical implementation of vacuum system 200 of FIG. 2. Vacuum system 300 can be used for at least one of holding or compacting an object.

Vacuum system 300 comprises impermeable layer 302, number of pressure inlets 304 extending through impermeable layer 302, and number of valve handles 306 connected to number of pressure inlets 304. In this illustrative example, number of valve handles 306 comprises one valve handle, valve handle 308. Number of valve handles 306 is configured to actuate between active position 310 applying a vacuum to impermeable layer 302 or an inactive position venting impermeable layer 302 to atmosphere.

Valve handle 308 comprises vacuum inlet 312, vacuum outlet 314, valve 315 between vacuum inlet 312 and vacuum outlet 314, first grip 316, and second grip 318. Valve handle 308 can be moved from active position 310 to an inactive position by moving second grip 318 towards first grip 316.

In this illustrative example, vacuum system 300 further comprises support 320. Support 320 provides additional rigidity to impermeable layer 302. Support 320 aids in maintaining the shape of impermeable layer 302.

Vacuum system 300 can be used with a single hand by an operator. When using vacuum system 300, an operator can place a composite material on a tool or other support structure with one hand and then place vacuum system 300 over the composite material with the other hand. Vacuum system 300 can be used to hold the composite material against the tool or other support structure. In some illustrative examples, vacuum system 300 can be used to compact the composite material against the tool.

Figure 4:
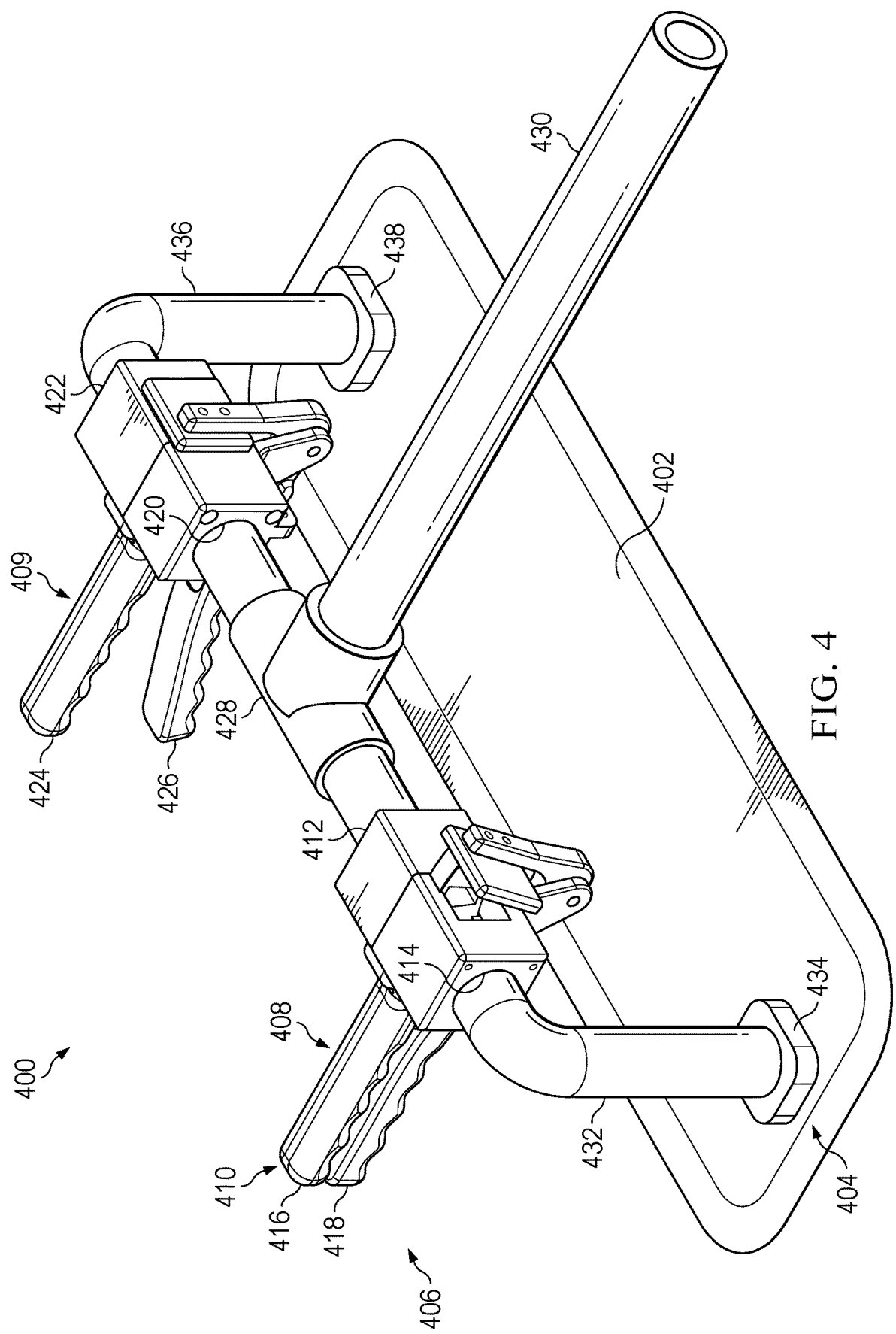
FIG. 4 is an illustration of a perspective view of a vacuum system with two valve handles in accordance with an illustrative embodiment.

Turning now to FIG. 4, an illustration of a perspective view of a vacuum system with two valve handles is depicted in accordance with an illustrative embodiment. Vacuum system 400 is a physical implementation of vacuum system 200 of FIG. 2. Vacuum system 400 can be used for at least one of holding or compacting an object.

Vacuum system 400 comprises impermeable layer 402, number of pressure inlets 404 extending through impermeable layer 402, and number of valve handles 406 connected to number of pressure inlets 404. In this illustrative example, number of valve handles 406 comprises two valve handles, valve handle 408 and valve handle 409. Number of valve handles 406 is configured to actuate between active position 410 applying a vacuum to impermeable layer 402 or an inactive position venting impermeable layer 402 to atmosphere.

Valve handle 408 comprises vacuum inlet 412, vacuum outlet 414, first grip 416, and second grip 418. Valve handle 408 can be moved from active position 410 to an inactive position by moving second grip 418 towards first grip 416.

Valve handle 409 comprises vacuum inlet 420, vacuum outlet 422, first grip 424, and second grip 426. Valve handle 409 can be moved from active position 410 to an inactive position by moving second grip 426 towards first grip 424.

In this illustrative example, vacuum inlet 412 and vacuum inlet 420 are connected by piping 428. Vacuum inlet 412 and vacuum inlet 420 are connected to a single vacuum source by piping 428. In this illustrative example, vacuum is provided by a vacuum source to piping 428 by retractable hose 430.

Piping 432 connects vacuum outlet 414 to pressure inlet 434 of number of pressure inlets 404. Piping 436 connects vacuum outlet 422 to pressure inlet 438 of number of pressure inlets 404.

Figure 5:
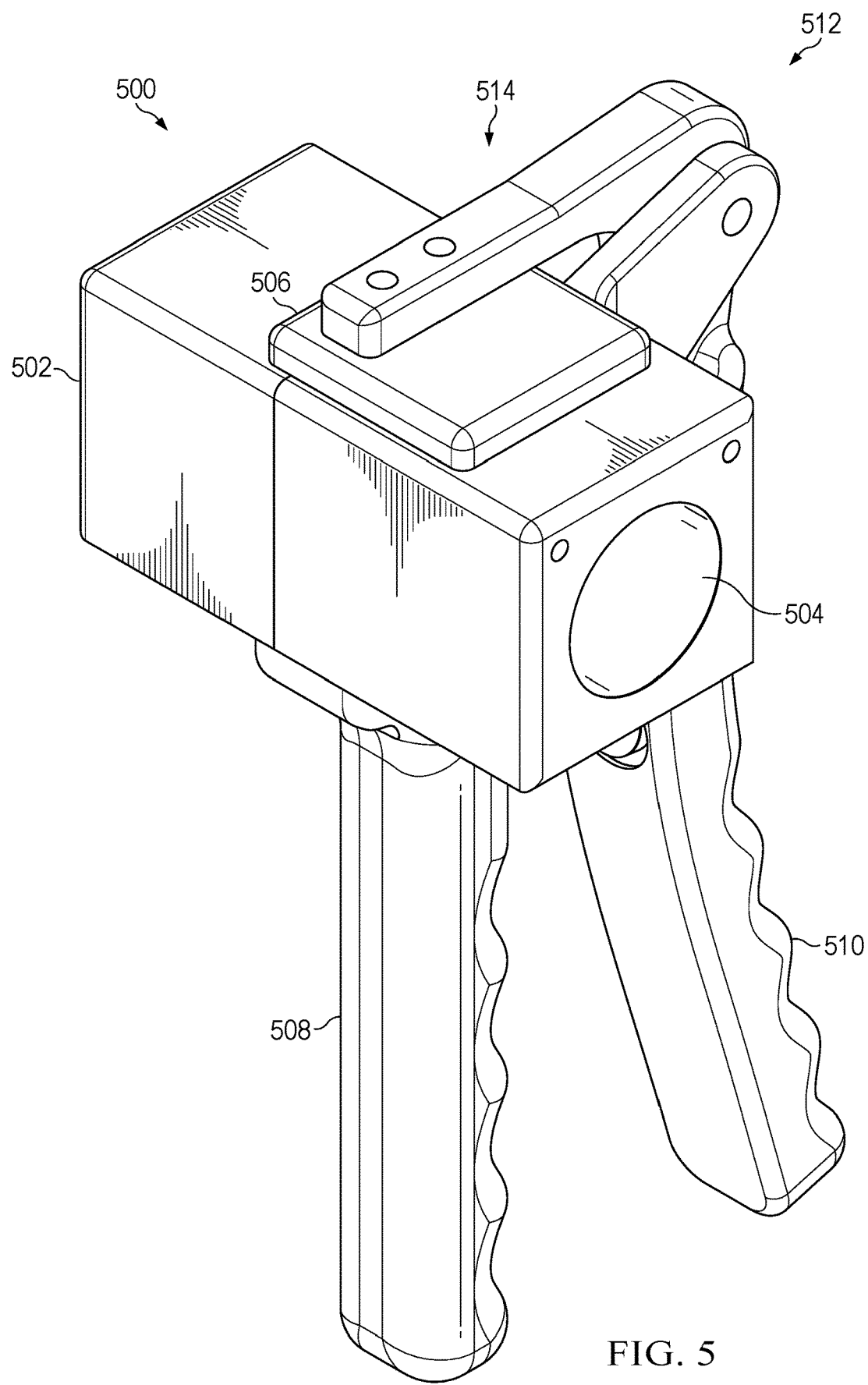
FIG. 5 is an illustration of a perspective view of a valve handle in an active position in accordance with an illustrative embodiment.

Turning now to FIG. 5, an illustration of a perspective view of a valve handle in an active position is depicted in accordance with an illustrative embodiment. Valve handle 500 is a physical implementation of first valve handle 216 of FIG. 2. Valve handle 500 can be an implementation of valve handle 308 of FIG. 3. In some illustrative examples, valve handle 500 can be an implementation of valve handle 409 of FIG. 4.

Valve handle 500 comprises vacuum inlet 502, vacuum outlet 504, valve 506 between vacuum inlet 502 and vacuum outlet 504, first grip 508, and second grip 510 moveable relative to first grip 508 to actuate valve 506. In view 512, valve handle 500 is in active position 514. In this illustrative example, valve handle 500 is set to direct vacuum into an impermeable layer (not depicted).

Figure 6:
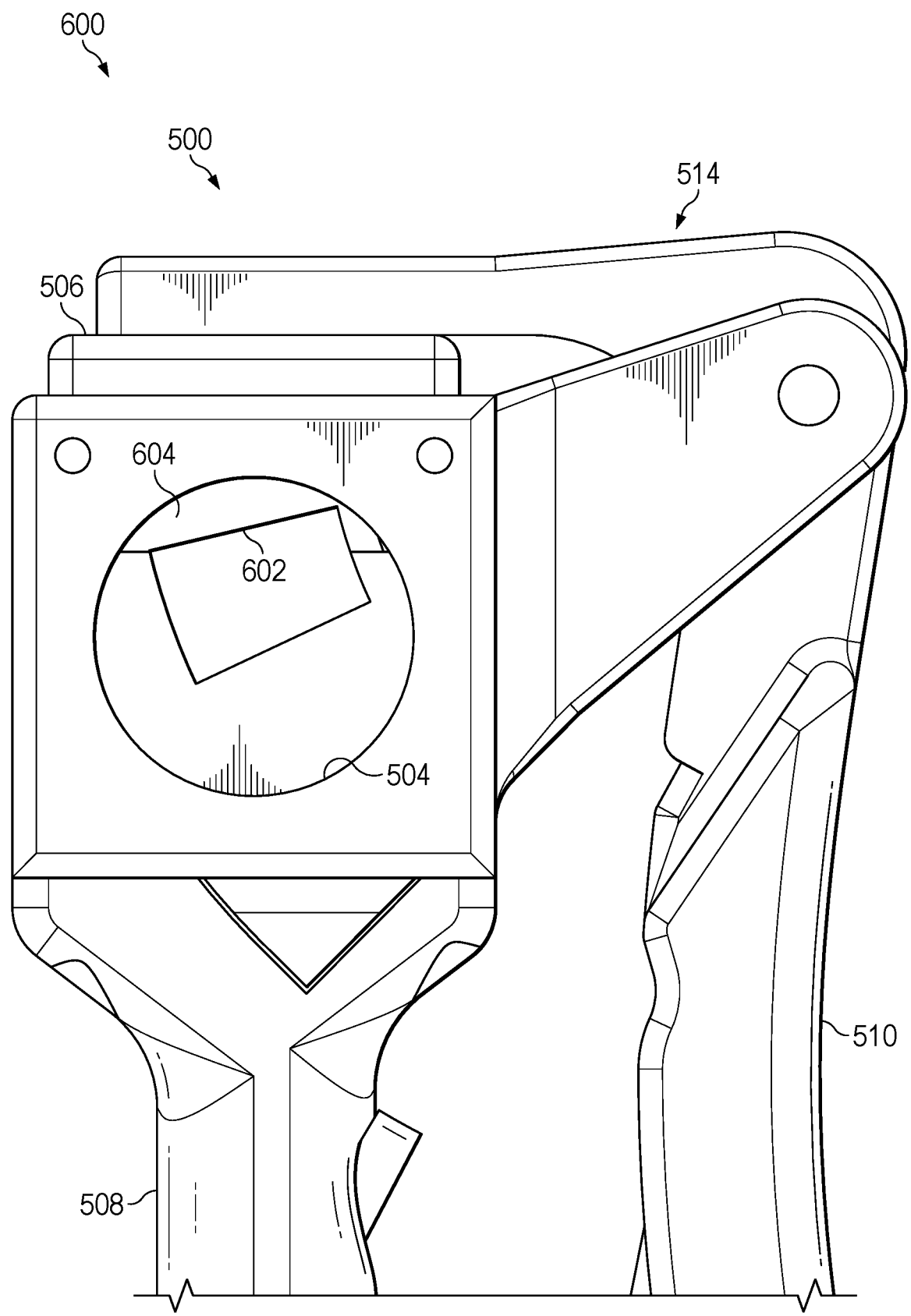
FIG. 6 is an illustration of a side view of a valve handle in an active position in accordance with an illustrative embodiment.

Turning now to FIG. 6, an illustration of a side view of a valve handle in an active position is depicted in accordance with an illustrative embodiment. View 600 is a side view of valve handle 500 in active position 514. In view 600, passage 602 through disc 604 of valve 506 is visible through vacuum outlet 504.

Figure 7:
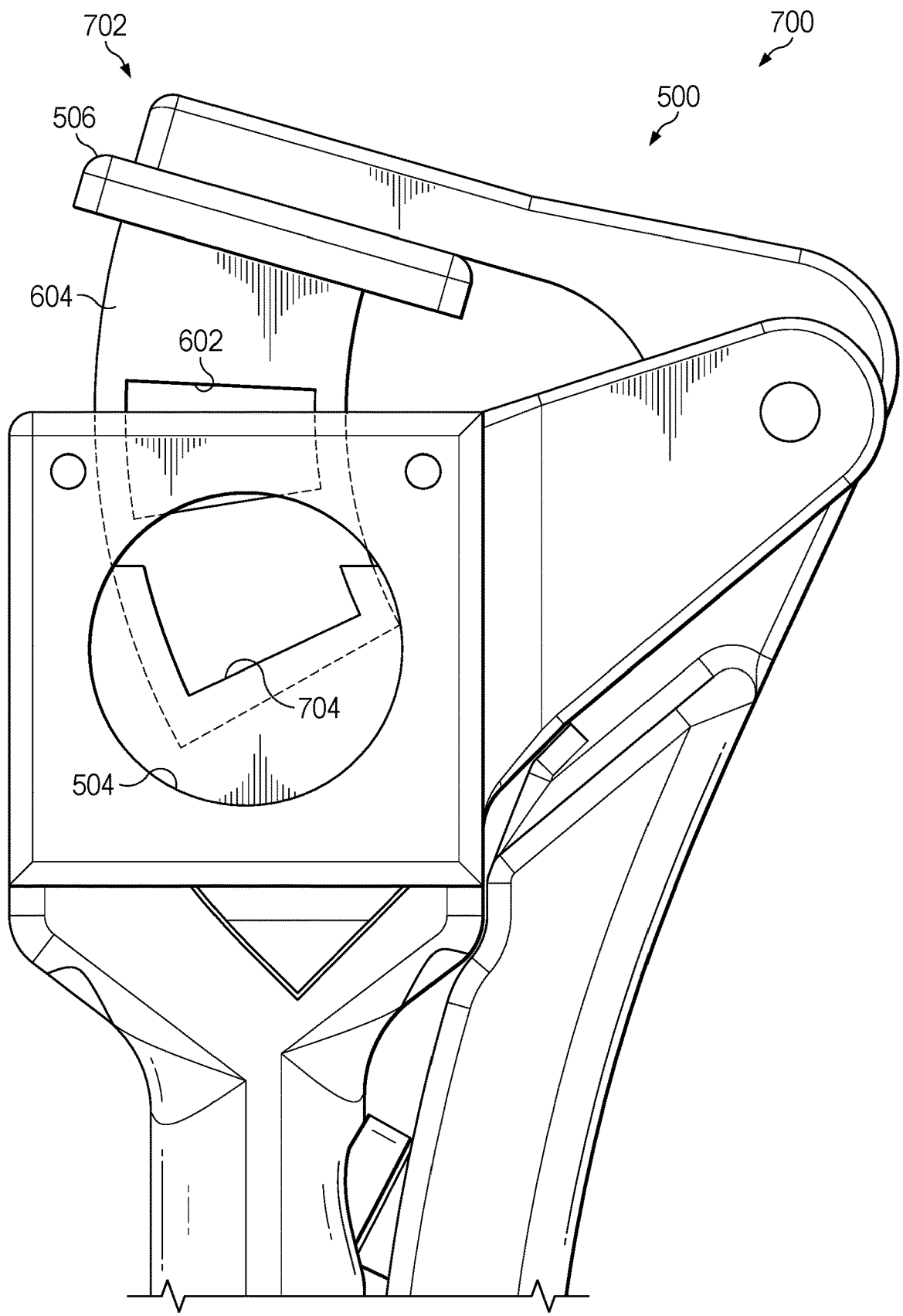
FIG. 7 is an illustration of a side view of a valve handle in an inactive position in accordance with an illustrative embodiment.

Turning now to FIG. 7, an illustration of a side view of a valve handle in an inactive position is depicted in accordance with an illustrative embodiment. View 700 is a side view of valve handle 500 in inactive position 702. In view 700, passage 602 through disc 604 of valve 506 is visible above vacuum inlet 502.

In view 700, opening 704 in vacuum inlet 502 is depicted. In view 700, disc 604 blocking opening 704 can be seen through vacuum inlet 502.

Figure 8:
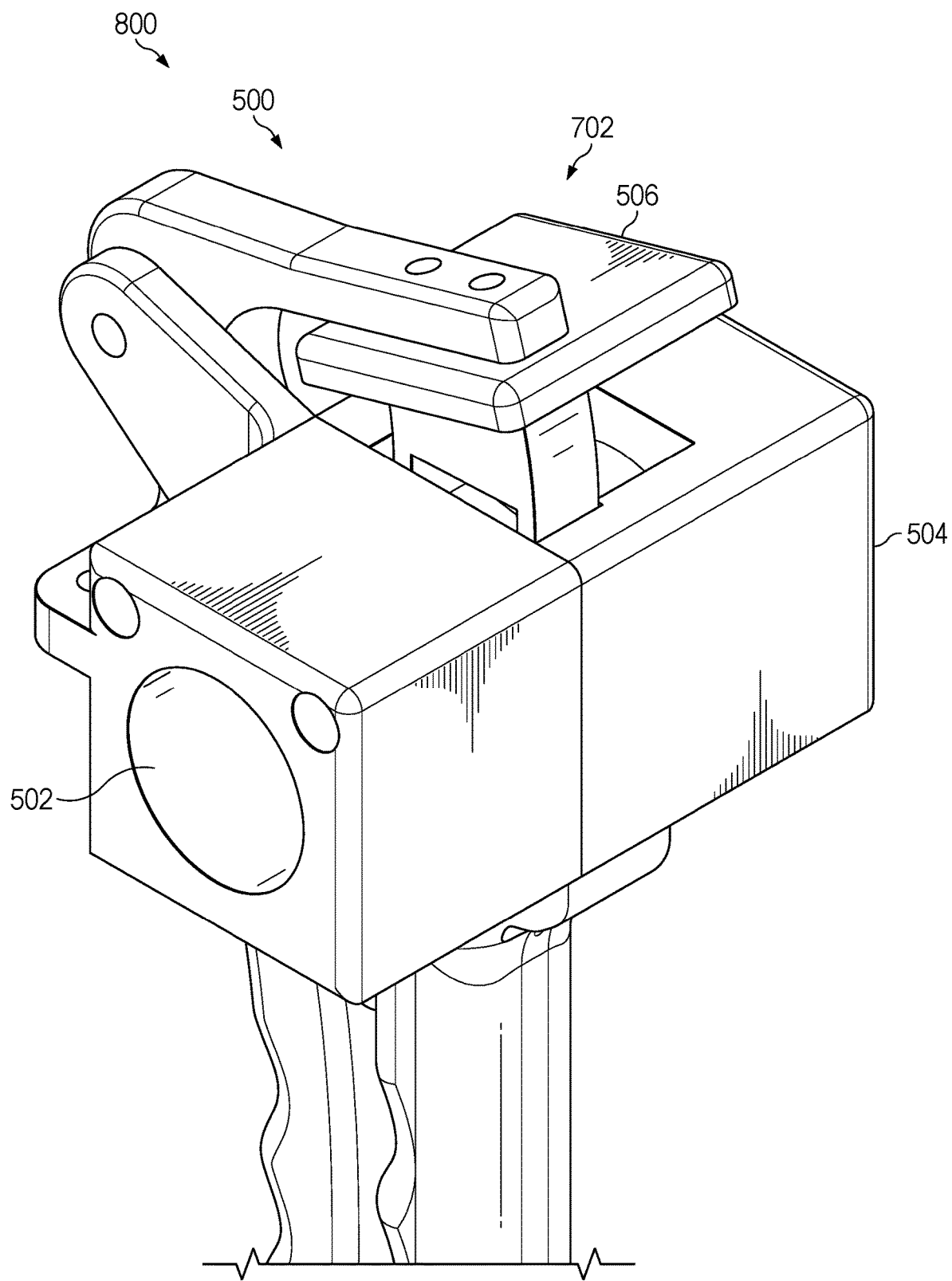
FIG. 8 is an illustration of a top perspective view of a valve handle in an inactive position in accordance with an illustrative embodiment.

Turning now to FIG. 8, an illustration of a top perspective view of a valve handle in an inactive position is depicted in accordance with an illustrative embodiment. View 800 is a top perspective view of valve handle 500 in inactive position 702. In view 800 valve 506 has moved relative to vacuum outlet 504.

Figure 9:
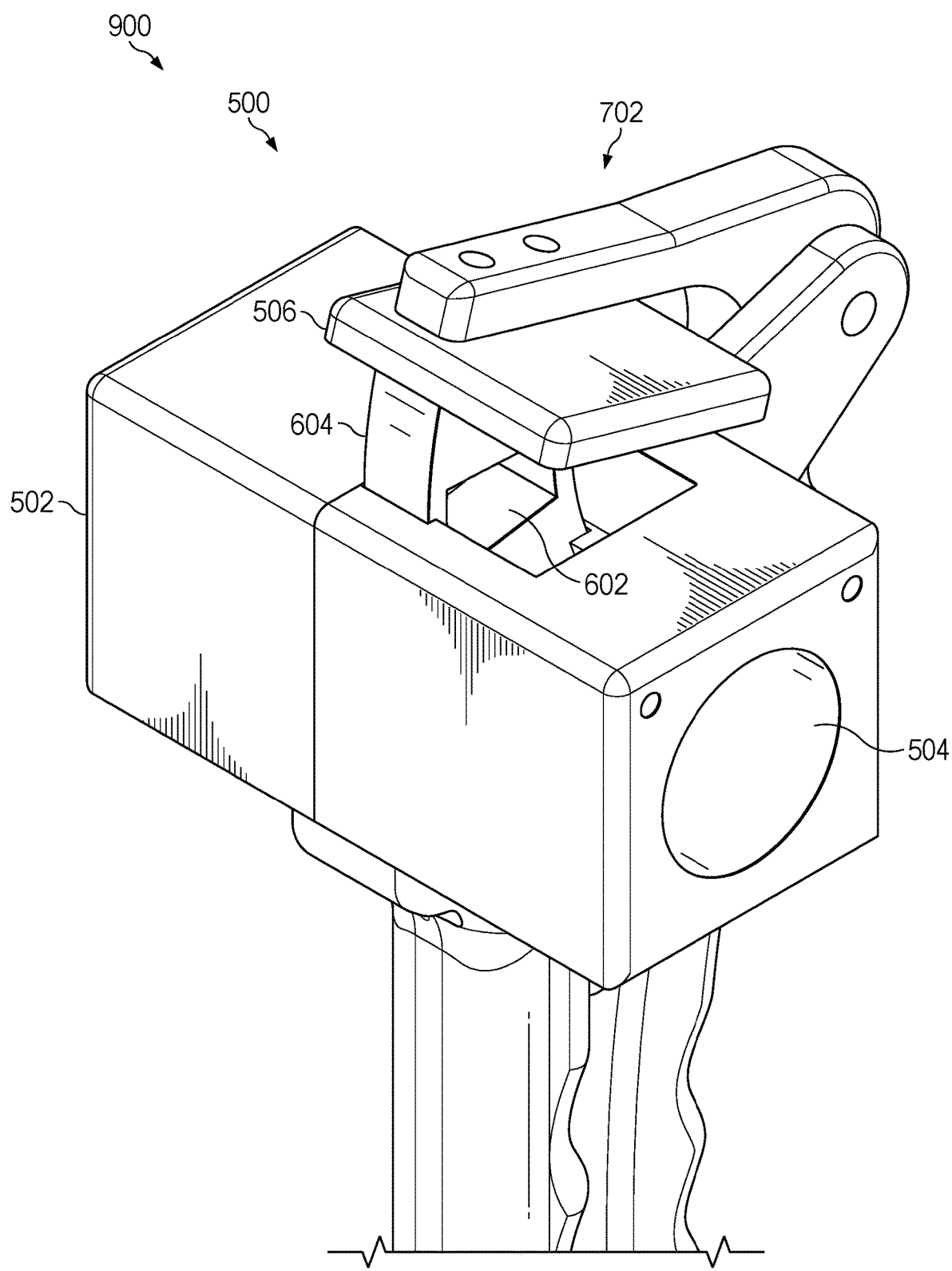
FIG. 9 is an illustration of a top perspective view of a valve handle in an inactive position in accordance with an illustrative embodiment.

Turning now to FIG. 9, an illustration of a top perspective view of a valve handle in an inactive position is depicted in accordance with an illustrative embodiment. In view 900 passage 602 in disc 604 is exposed to the atmosphere outside of valve handle 500. In view 900, passage 602 vents vacuum outlet 504 to the atmosphere. An impermeable layer connected pneumatically to vacuum outlet 504, such as impermeable layer 204 of FIG. 2, is vented when passage 602 vents vacuum outlet 504 to the atmosphere.

Figure 10:
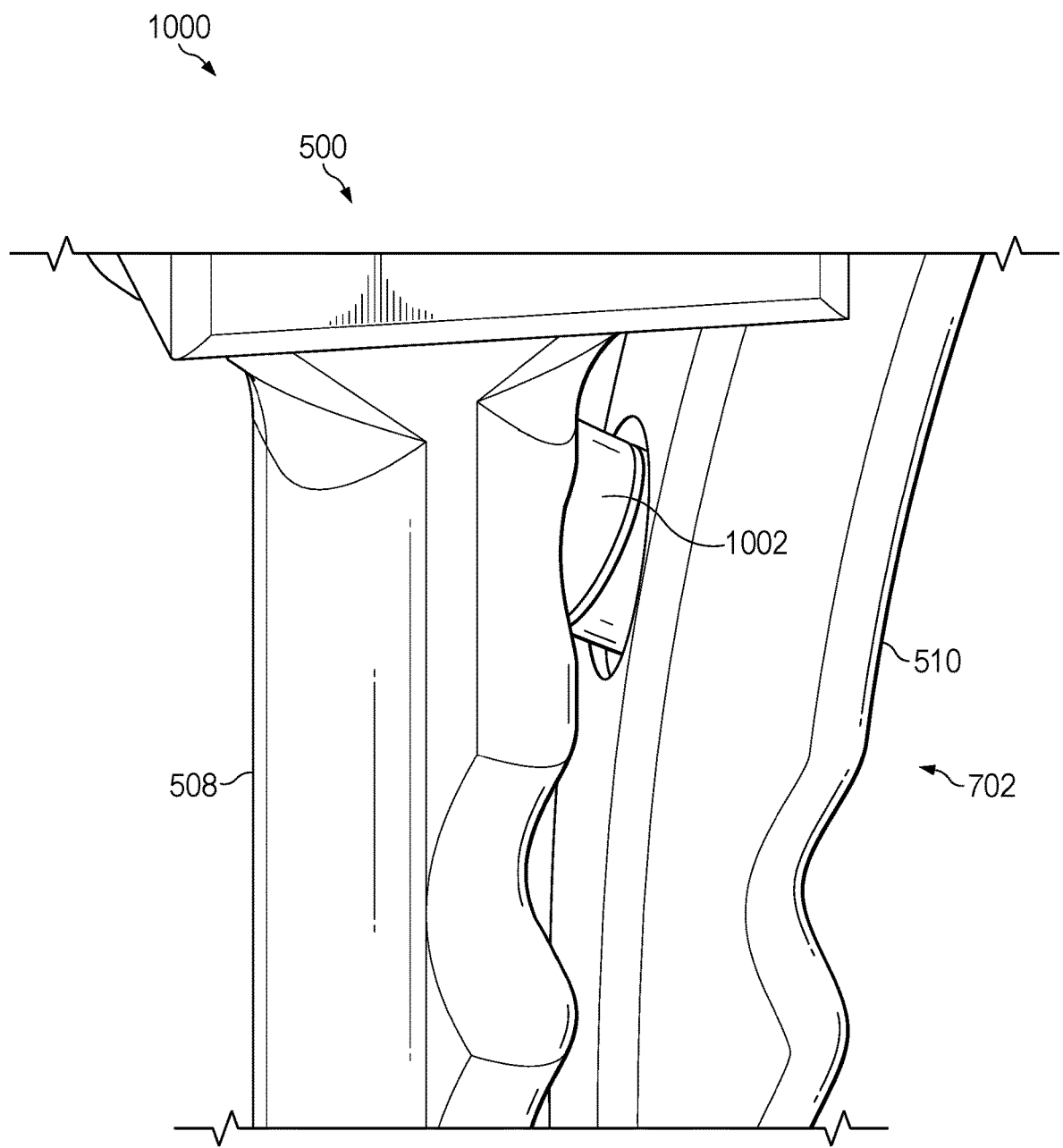
FIG. 10 is an illustration of a side view of a connection between a first grip and a second grip in a valve handle in accordance with an illustrative embodiment.

Turning now to FIG. 10, an illustration of a side view of a connection between a first grip and a second grip in a valve handle is depicted in accordance with an illustrative embodiment. View 1000 is a view of spring 1002 between first grip 508 and second grip 510. In this illustrative example, second grip 510 has been squeezed towards first grip 508 such that valve handle 500 is in inactive position 702. Spring 1002 biased second grip 510 away from first grip 508 when force is not applied by an operator.

Figure 11:
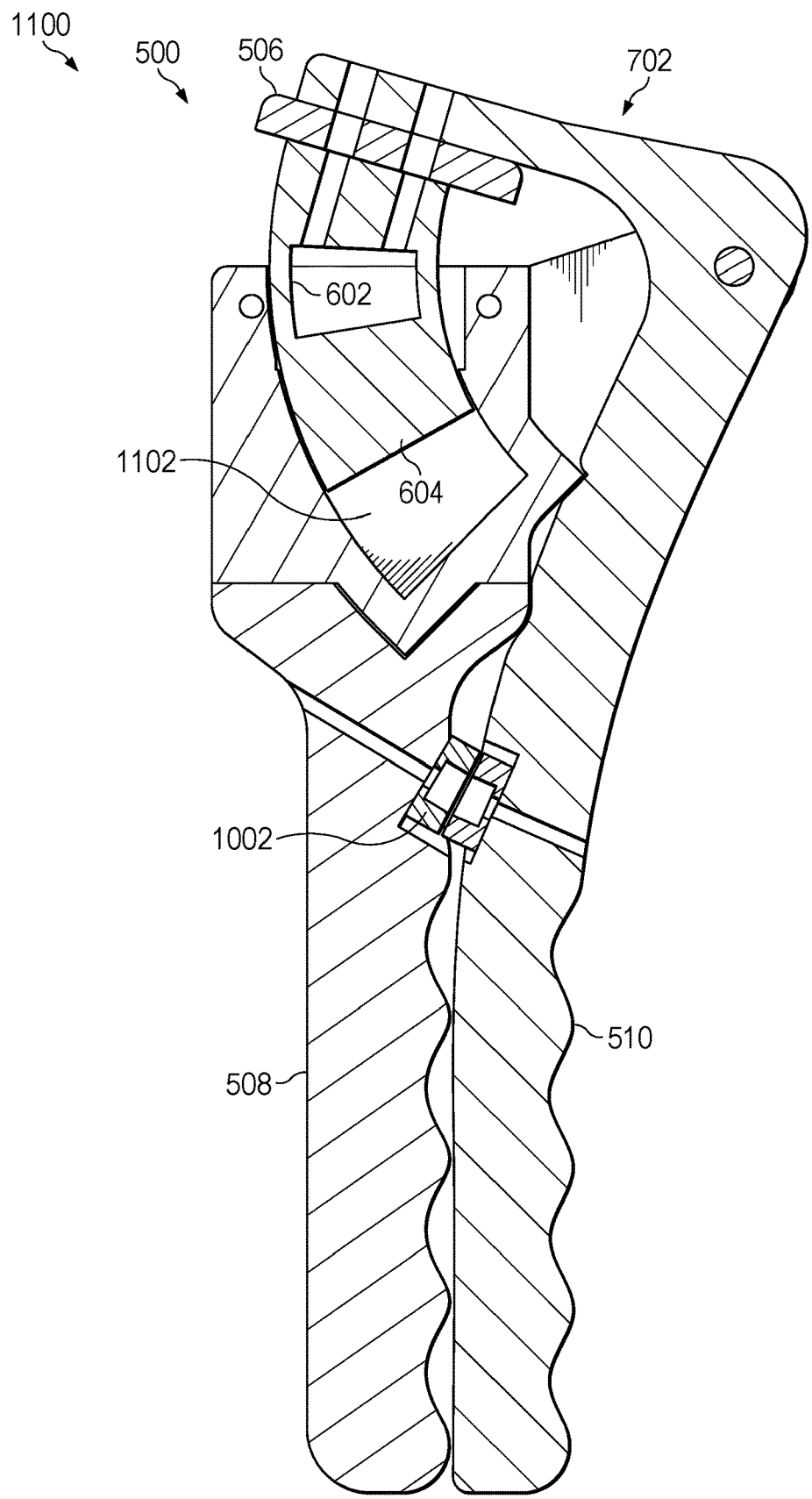
FIG. 11 is an illustration of a cross-sectional side view of a valve handle in accordance with an illustrative embodiment.

Turning now to FIG. 11, an illustration of a cross-sectional side view of a valve handle is depicted in accordance with an illustrative embodiment. In view 1100, a cross-section is shown through valve 506. In view 1100, passage 602 is visible in inactive position 702. In view 1100, channel 1102, through which disc 604 slides, is visible. When second grip 510 is moved relative to first grip 508, disc 604 moves within channel 1102.

Figure 12:
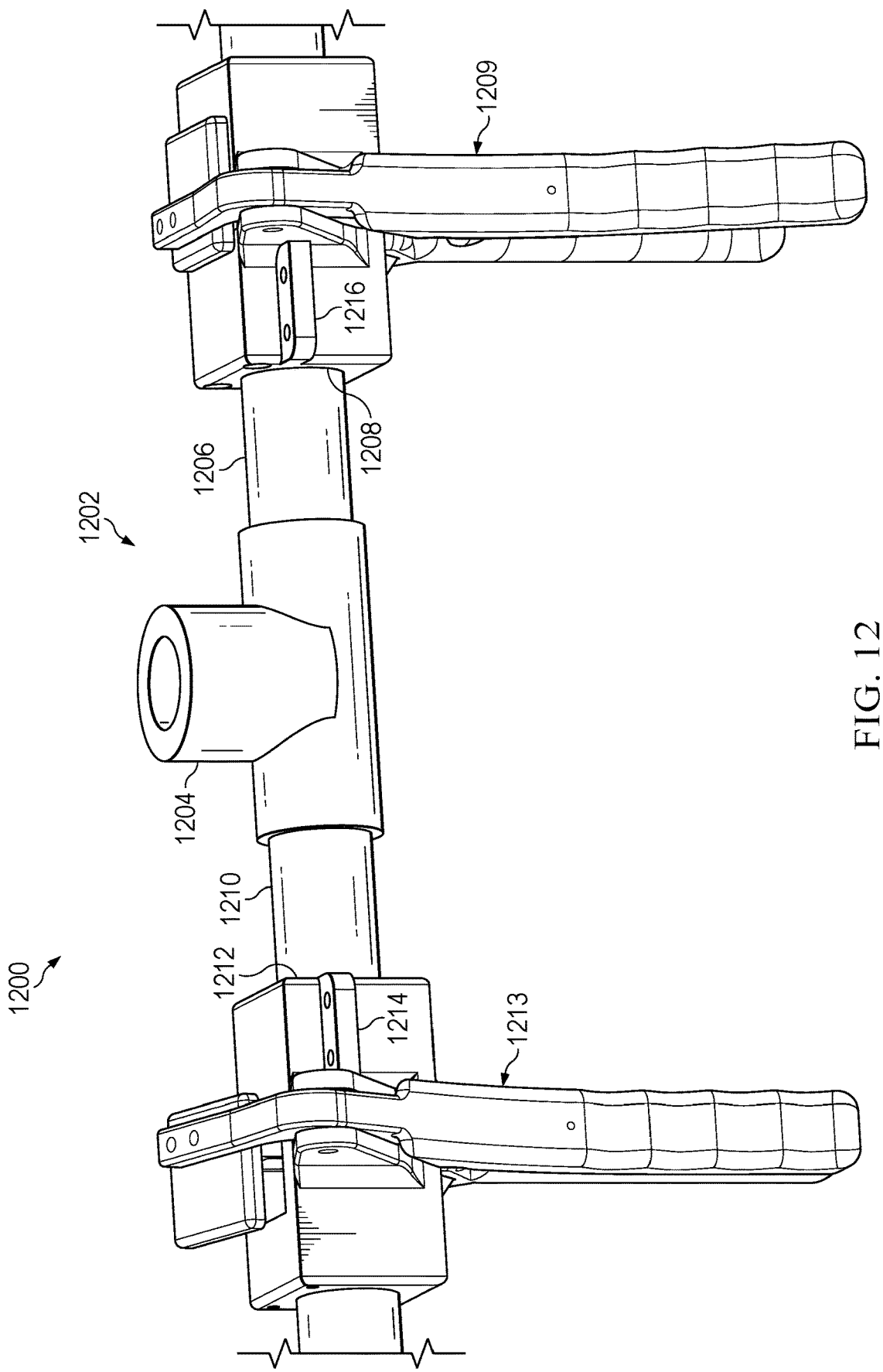
FIG. 12 is an illustration of a front perspective view of a connection between two valve handles in accordance with an illustrative embodiment.

Turning now to FIG. 12, an illustration of a front perspective view of a connection between two valve handles is depicted in accordance with an illustrative embodiment. Vacuum system 1200 is a physical implementation of vacuum system 200 of FIG. 2. Vacuum system 1200 includes piping 1202. Piping includes junction 1204 to connect piping 1210 and piping 1206. Piping 1206 directs vacuum to vacuum inlet 1208 of valve handle 1209. Piping 1210 directs vacuum to vacuum inlet 1212 of valve handle 1213.

Valve handle 1209 comprises connection point 1216 that allows for loose rotation. Connection point 1216 allows for movement of valve handle 1209 relative to the plane in the bag. Valve handle 1213 comprises connection point 1214 that allows for loose rotation. Connection point 1214 allows for movement of valve handle 1213 relative to the plane in the bag.

In some illustrative examples, valve handle 1209 and valve handle 1213 are fixed to each other with a connector (not shown) at connection point 1214 and connection point 1216. A connector allows for valve handle 1209 and valve handle 1213 to rotate together about the axes of piping 1210 and 1206 while maintaining junction 1204 fixed.

Figure 13:
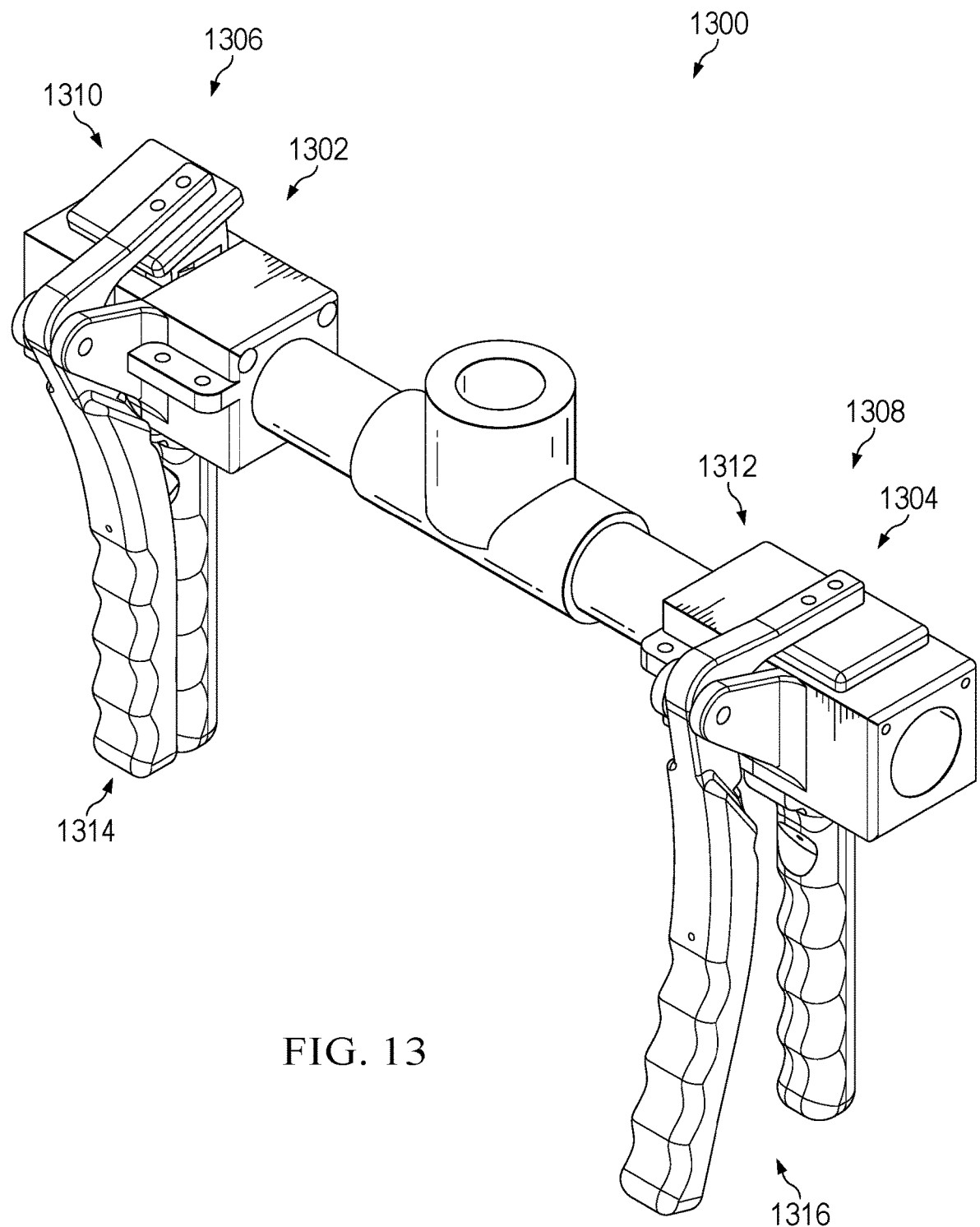
FIG. 13 is an illustration of a perspective view of two connected valve handles in accordance with an illustrative embodiment.

Turning now to FIG. 13, an illustration of a perspective view of two connected valve handles is depicted in accordance with an illustrative embodiment. Vacuum system 1300 is an example of a portion of vacuum system 200 of FIG. 2.

Vacuum system 1300 comprises a number of valve handles: first valve handle 1302 and second valve handle 1304. In this illustrative example, first valve handle 1302 is in inactive position 1306 while second valve handle 1304 is in active position 1308. As can be seen in FIG. 11, valve 1310 is elevated above the remaining portions of first valve handle 1302 such that first valve handle 1302 is venting to atmosphere. As can be seen in FIG. 11, valve 1312 is flush with the top of second valve handle 1304 such that second valve handle 1304 provides vacuum for either holding or compacting as desired.

This illustration is intended to depict the differences in an inactive position and an active position. To remove vacuum system 1300 from a support structure, such as a mandrel or other tool, both first valve handle 1302 and second valve handle 1304 should be in inactive position 1306.

Figure 14:
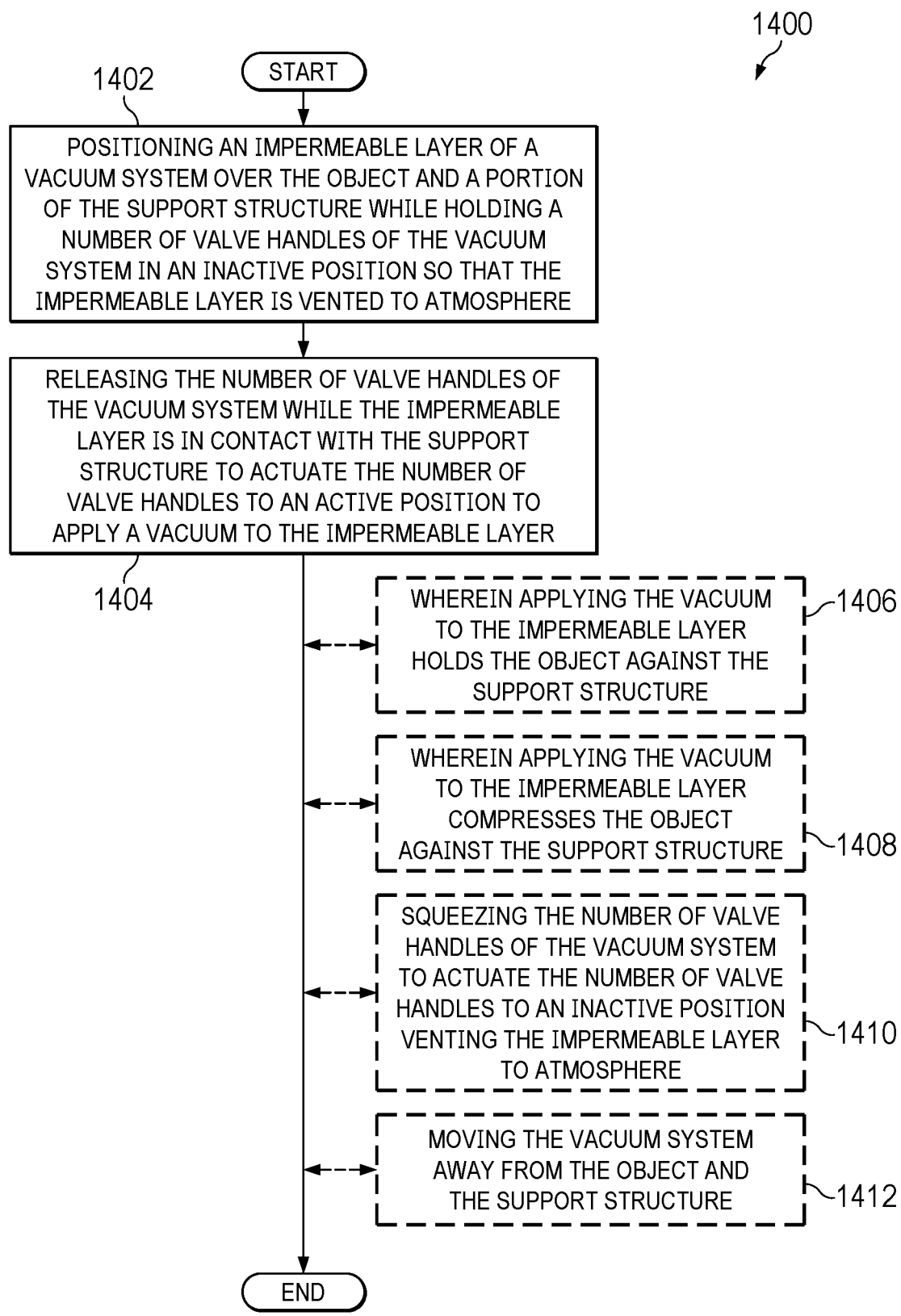
FIG. 14 is a flowchart of a method of managing an object against a support structure in accordance with an illustrative embodiment.

Turning now to FIG. 14, a flowchart of a method of managing an object against a support structure is depicted in accordance with an illustrative embodiment. Components of aircraft 100 can be manufactured using method 1400. Method 1400 can be performed using vacuum system 200 of FIG. 2. Method 1400 can be performed using vacuum system 300 of FIG. 3. Method 1400 can be performed using vacuum system 400 of FIG. 4. Method 1400 can be performed using valve handle 500 of FIGS. 5-11. Method 1400 can be performed using vacuum system 1200 of FIG. 12. Method 1400 can be performed using vacuum system 1300 of FIG. 13.

Method 1400 can manage an object against a support structure. Method 1400 positions an impermeable layer of a vacuum system over the object and a portion of the support structure while holding a number of valve handles of the vacuum system in an inactive position so that the impermeable layer is vented to atmosphere (operation 1402). Method 1400 releases the number of valve handles of the vacuum system while the impermeable layer is in contact with the support structure to actuate the number of valve handles to an active position to apply a vacuum to the impermeable layer (operation 1404). Afterwards, method 1400 terminates.

In some illustrative examples, applying the vacuum to the impermeable layer holds the object against the support structure (operation 1406). In some illustrative examples, applying the vacuum to the impermeable layer compresses the object against the support structure (operation 1408).

In some illustrative examples, method 1400 squeezes the number of valve handles of the vacuum system to actuate the number of valve handles to an inactive position venting the impermeable layer to atmosphere (operation 1410). In some illustrative examples, method 1400 moves the vacuum system away from the object and the support structure (operation 1412).

Figure 15:
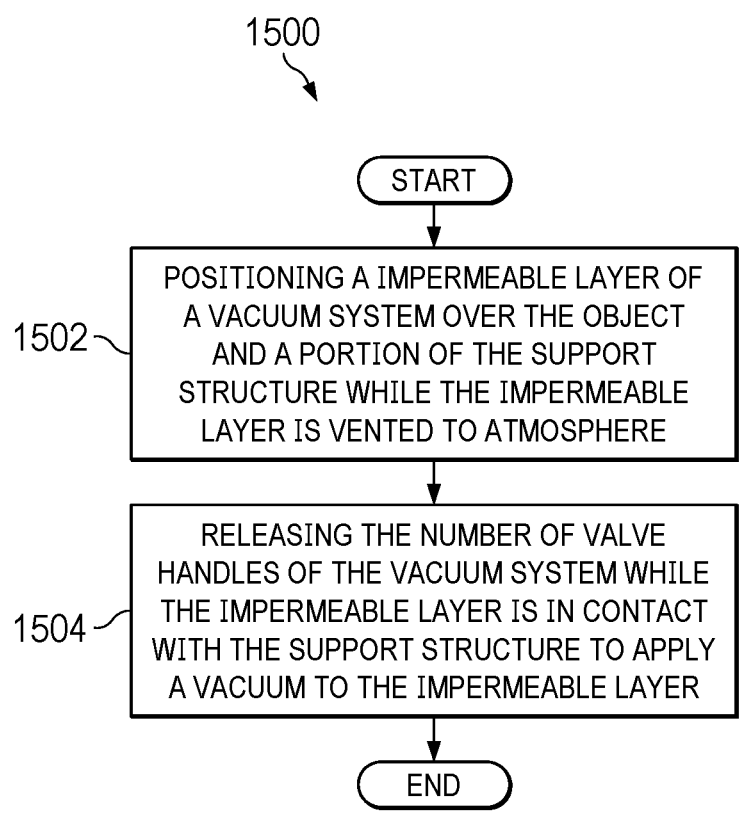
FIG. 15 is a flowchart of a method of managing an object against a support structure in accordance with an illustrative embodiment.

Turning now to FIG. 15, a flowchart of a method of managing an object against a support structure is depicted in accordance with an illustrative embodiment. Components of aircraft 100 can be manufactured using method 1500. Method 1500 can be performed using vacuum system 200 of FIG. 2. Method 1500 can be performed using vacuum system 300 of FIG. 3. Method 1500 can be performed using vacuum system 400 of FIG. 4. Method 1500 can be performed using valve handle 500 of FIGS. 5-11. Method 1500 can be performed using vacuum system 1200 of FIG. 12. Method 1500 can be performed using vacuum system 1300 of FIG. 13.

Method 1500 positions an impermeable layer of a vacuum system over the object and a portion of the support structure while the impermeable layer is vented to atmosphere (operation 1502). Method 1500 releases a number of valve handles of the vacuum system while the impermeable layer is in contact with the support structure to apply a vacuum to the impermeable layer (operation 1504). Afterwards, method 1500 terminates.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1406 through operation 1412 may be optional.

Figure 16:
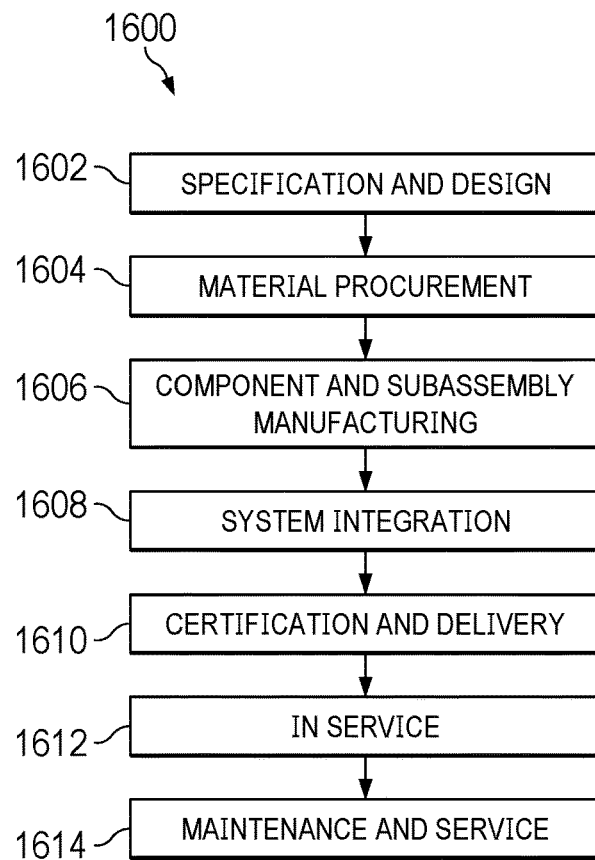
FIG. 16 is an illustration of an aircraft manufacturing and service method in a form of a block diagram in accordance with an illustrative embodiment.
Figure 17:
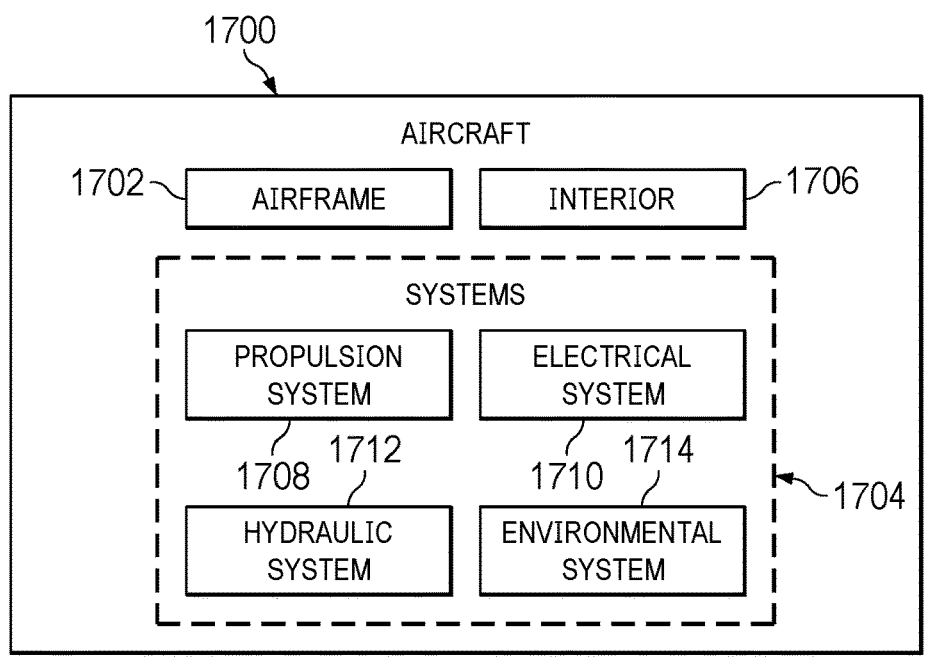
FIG. 17 is an illustration of an aircraft in a form of a block diagram in which an illustrative embodiment may be implemented.

Illustrative embodiments of the present disclosure may be described in the context of aircraft manufacturing and service method 1600 as shown in FIG. 16 and aircraft 1700 as shown in FIG. 17. Turning first to FIG. 16, an illustration of an aircraft manufacturing and service method in a form of a block diagram is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 takes place. Thereafter, aircraft 1700 may go through certification and delivery 1610 in order to be placed in service 1612. While in service 1612 by a customer, aircraft 1700 is scheduled for routine maintenance and service 1614, which may include modification, reconfiguration, refurbishment, or other maintenance and service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft in a form of a block diagram is depicted in which an illustrative embodiment may be implemented. In this example, aircraft 1700 is produced by aircraft manufacturing and service method 1600 of FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included.

Apparatuses and methods embodied herein may be employed during at least one of the stages of aircraft manufacturing and service method 1600. One or more illustrative embodiments may be manufactured or used during at least one of component and subassembly manufacturing 1606, system integration 1608, in service 1612, or maintenance and service 1614 of FIG. 16.

The illustrative examples present a vacuum compaction device for small composite details. The illustrative examples solve the problem of quick compaction.

The illustrative examples present a vacuum compaction device that can be used on uncured composite frame filler installation for the fuselage and/or the wing. Technical features of the vacuum compaction device for small composite details include tapeless compaction bagging and a normally open valve design.

The illustrative examples mitigate risk of frame filler slippage. The illustrative examples satisfy the frame filler compaction. The illustrative examples provide a localized compaction method immediately following the frame filler installation. The illustrative examples provide for compaction without the use of tape.

The illustrative examples provide a method for compacting frame fillers at installation locations prior to the rotation of the mandrel segment. The illustrative examples provide isolated compaction. The illustrative examples can reduce or eliminate full bag compaction at the end of the installation process. Elimination of full bag compaction can reduce critical path flow time.

The illustrative examples provide improved quality results (minimized risk of slipped frame fillers due to insufficient compaction), enable concurrent work (increased production rate), and improved ergonomic conditions.

The technical features of the vacuum compaction device for small composite details include a normally open valve design and an ergonomic trigger design that enables fast installation of the device onto the mandrel segment. The illustrative examples incorporate tapeless compaction technology to create a self-sealing compaction bag system that is applied over the frame filler at the frame filler locations on the mandrel segment. A normally open vacuum valve design allows for hands-free compaction. A normally open vacuum valve design allows for vacuum to always be on.

The illustrative examples provide an ergonomic trigger hand actuation design to open/close vacuum valve which allows for quick compaction. The illustrative examples can eliminate full bag compaction at end of installation process (can compact fillers concurrently with installation).

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A vacuum system for at least one of holding or compacting an object, the vacuum system comprising:
   an impermeable layer;
   a number of pressure inlets extending through the impermeable layer; and
   a number of valve handles connected to the number of pressure inlets, the number of valve handles configured to actuate between an active position applying a vacuum to the impermeable layer or an inactive position venting the impermeable layer to atmosphere.

2. The vacuum system of claim 1, wherein each valve handle of the number of valve handles comprises a disc with a passage that extends through the disc and moves between a first position to apply the vacuum to the impermeable layer and a second position to block a flow of vacuum to impermeable layer and to vent the impermeable layer.

3. The vacuum system of claim 2, wherein the passage is open to the atmosphere when a respective valve handle is held by an operator.

4. The vacuum system of claim 1, wherein each valve handle of the number of valve handles is spring-loaded to the active position.

5. The vacuum system of claim 1, wherein the number of valve handles comprises two valve handles.

6. The vacuum system of claim 5, wherein the two valve handles are pneumatically connected to a single vacuum source.

7. The vacuum system of claim 1 further comprising:
   a retractable hose pneumatically connected to the number of valve handles.

8. The vacuum system of claim 1, wherein each of the number of valve handles comprises a vacuum inlet, a vacuum outlet, a valve between the vacuum inlet and the vacuum outlet, a first grip, and a second grip moveable relative to the first grip to actuate the valve.

9. A vacuum system for at least one of holding or compacting an object, the vacuum system comprising:
   an impermeable layer; and
   a number of valve handles connected to the impermeable layer, the number of valve handles configured to control application of vacuum to an impermeable layer and provide a carry mechanism.

10. The vacuum system of claim 9, wherein each valve handle of the number of valve handles comprises a vacuum inlet, a vacuum outlet, a valve between the vacuum inlet and the vacuum outlet, a first grip, and a second grip moveable relative to the first grip to actuate the valve.

11. The vacuum system of claim 10, wherein the valve comprises a disc with passage that extends through the disc and moves between a first position to apply the vacuum to the impermeable layer and a second position to block a flow of vacuum to impermeable layer and to vent the impermeable layer.

12. The vacuum system of claim 11, wherein the passage is open to atmosphere when a respective valve handle is held by an operator.

13. The vacuum system of claim 9 further comprising:
   a permeable layer configured to disperse the vacuum beneath the impermeable layer.

14. The vacuum system of claim 9, wherein the number of valve handles comprises two valve handles.

15. The vacuum system of claim 14, wherein the two valve handles are pneumatically connected to a single vacuum source.

16. The vacuum system of claim 9, wherein each valve handle of the number of valve handles is spring-loaded to an active position.

17. A method of managing an object against a support structure, the method comprising:
   positioning an impermeable layer of a vacuum system over the object and a portion of the support structure while holding a number of valve handles of the vacuum system in an inactive position so that the impermeable layer is vented to atmosphere; and
   releasing the number of valve handles of the vacuum system while the impermeable layer is in contact with the support structure to actuate the number of valve handles to an active position to apply a vacuum to the impermeable layer.

18. The method of claim 17, wherein applying the vacuum to the impermeable layer holds the object against the support structure.

19. The method of claim 17, wherein applying the vacuum to the impermeable layer compresses the object against the support structure.

20. The method of claim 17 further comprising:
   squeezing the number of valve handles of the vacuum system to actuate the number of valve handles to an inactive position venting the impermeable layer to atmosphere; and
   moving the vacuum system away from the object and the support structure.

21. A method of managing an object against a support structure, the method comprising:
   positioning an impermeable layer of a vacuum system over the object and a portion of the support structure while the impermeable layer is vented to atmosphere; and
   releasing a number of valve handles of the vacuum system while the impermeable layer is in contact with the support structure to apply a vacuum to the impermeable layer.

* * * * *